2 Sheets--Sheet 1.

D. T. CASEMENT.
Car-Brakes.

No. 147,603. Patented Feb. 17, 1874.

WITNESSES:
A Bennenendorf
John C Kemon

INVENTOR:
Daniel T. Casement
BY
ATTORNEYS.

2 Sheets--Sheet 2.

D. T. CASEMENT.
Car-Brakes.

No. 147,603. Patented Feb. 17, 1874.

WITNESSES:
A Benneckendorf.
Golon C Kennon

INVENTOR:
Daniel T Casement
BY

ATTORNEYS.

AM. PHOTO-LITHOGRAPHIC CO. N.Y. (OSBORNE'S PROCESS.)

UNITED STATES PATENT OFFICE.

DANIEL T. CASEMENT, OF PAINESVILLE, OHIO.

IMPROVEMENT IN CAR-BRAKES.

Specification forming part of Letters Patent No. 147,603, dated February 17, 1874; application filed December 22, 1873.

*To all whom it may concern:*

Be it known that I, DANIEL T. CASEMENT, of Painesville, in the county of Lake and State of Ohio, have invented a new and Improved Car-Brake, of which the following is a specification:

My invention relates to improvements in the class of car-brakes wherein shoes or runners are suspended between the wheels and provided with levers of suitable kind for pressing them down on the track. The invention consists, first, in the construction and arrangement of devices with the vertically-adjustable shoes and band-spring brake for the wheels, whereby the driver or conductor of the car may conveniently, quickly, and powerfully brake the car; and, secondly, the invention consists in adjusting the band-spring brake and shoes by means hereinafter described.

Figure 1:
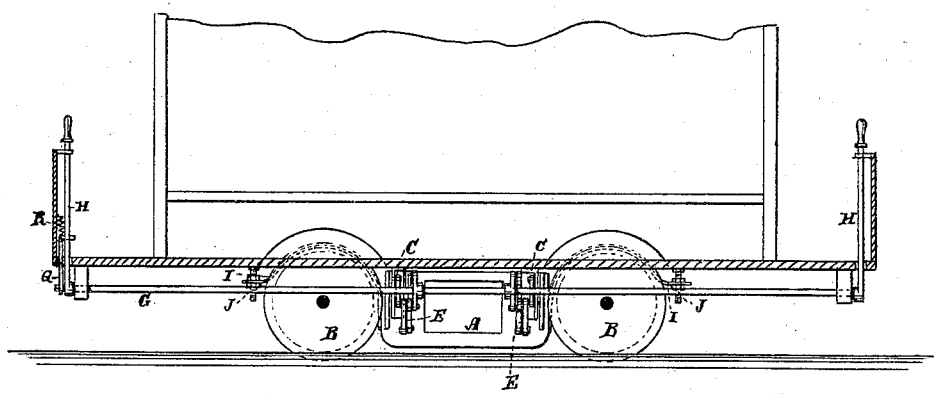
Figure 2:
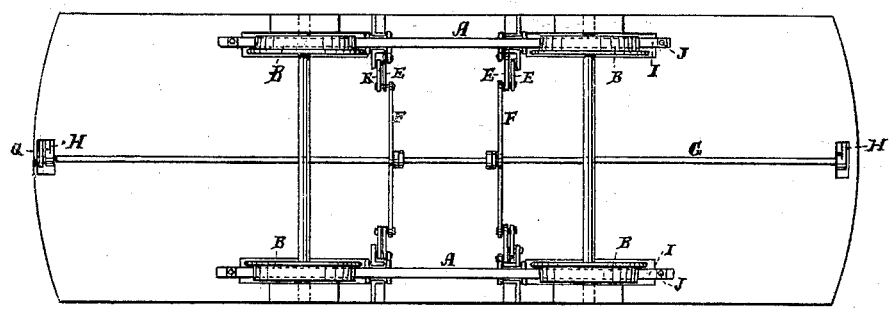
Figure 3:
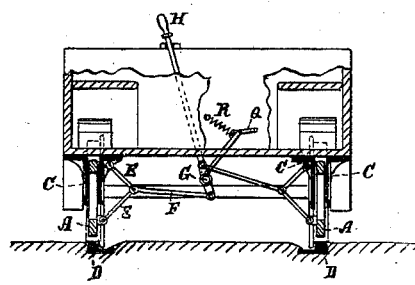
Figure 4:
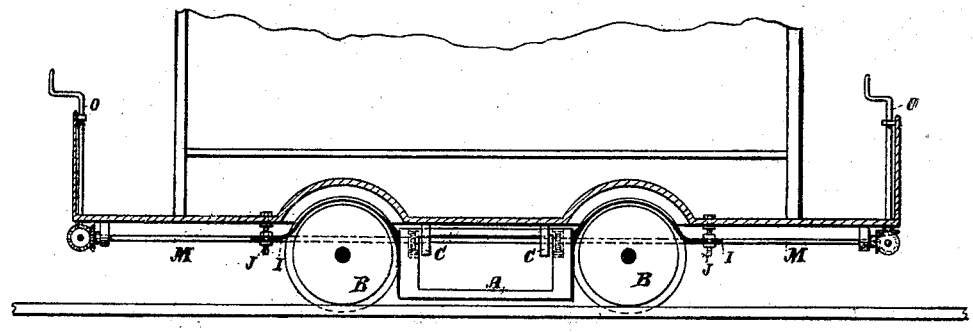
Figure 5:
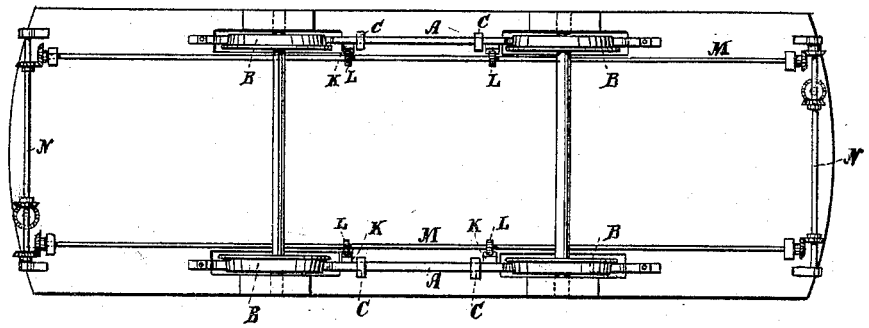

Figure 1 is a longitudinal sectional elevation of a street-car having brakes applied. Fig. 2 is a plan of the bottom of the car. Fig. 3 is an end view, partly in section and partly in elevation. Fig. 4 is a longitudinal sectional elevation, showing my arrangement of apparatus for actuating the brake; and Fig. 5 is a plan view of the same.

A represents the brake runners or shoes located between the wheels B of the car. They are fitted between stays C, projecting down from the car-body, to rise and fall freely directly above the rails D. In Figs. 1 and 2 they are shown suspended by toggle-jointed rods E and connecting-rods F, and from the rock-shaft G, operated by hand-levers H or foot-lever Q. I represents spring brake-bands attached to the ends of the bars A, and extending up over the wheels to fastening and adjusting screw and nuts J, to be pressed onto the wheels by said bars at the same time they (the bars) are pressed onto the rails. By the screw and nuts the springs can be readily adjusted to bear with the requisite force on the wheels while the shoes bear on the rails, or to cause them to lift and hold the shoes at various heights from the rails. These brakes are actuated by toothed racks K, Figs. 4 and 5, with a shaft, M, by pinion L, the shaft running along the car to the ends, and gearing with cross-shafts N, with which the brake-shaft O gears.

What I claim is—

1. The combination of the vertically-adjustable shoes A A, racks K K, pinions L L, shafts M M, cross-shafts N, and brake-shafts O, all constructed as shown and described, to operate as specified.

2. The combination of the shoes A A, spring brake-bands I, and the screw and nut adjusting devices, as and for the purpose specified.

DANIEL T. CASEMENT.

Witnesses:
A. P. THAYER,
T. B. MOSHER.